US010652443B2

(12) United States Patent
Liu et al.

(10) Patent No.: US 10,652,443 B2
(45) Date of Patent: *May 12, 2020

(54) LENS DRIVING MODULE WITH CASING HAVING PLASTIC MATERIAL AND ASSEMBLY METHOD THEREOF

(71) Applicant: TDK TAIWAN CORP., Taoyuan (TW)

(72) Inventors: Shou-Jen Liu, Taoyuan (TW);
Chia-Pin Hsu, Taoyuan (TW);
Shang-Yu Hsu, Taoyuan (TW);
Sin-Jhong Song, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,018

(22) Filed: Aug. 19, 2019

(65) Prior Publication Data

US 2019/0373149 A1 Dec. 5, 2019

Related U.S. Application Data

(63) Continuation of application No. 15/880,013, filed on Jan. 25, 2018, now Pat. No. 10,432,834.

(30) Foreign Application Priority Data

Jan. 25, 2017 (TW) .............................. 106102855 A

(51) Int. Cl.
| | | |
|---|---|---|
| *H04N 5/225* | (2006.01) |
| *G02B 13/00* | (2006.01) |
| *G03B 3/10* | (2006.01) |
| *H04N 5/232* | (2006.01) |
| *G02B 7/04* | (2006.01) |
| *G02B 7/08* | (2006.01) |
| *G02B 27/64* | (2006.01) |

(Continued)

(52) U.S. Cl.
CPC ............. *H04N 5/2254* (2013.01); *G02B 7/04* (2013.01); *G02B 7/08* (2013.01); *G02B 13/001* (2013.01); *G02B 27/646* (2013.01); *G03B 3/10* (2013.01); *G03B 5/00* (2013.01); *G03B 17/02* (2013.01); *H04N 5/2253* (2013.01); *H04N 5/23212* (2013.01); *G03B 2205/0069* (2013.01); *H04N 5/2258* (2013.01)

(58) Field of Classification Search
CPC ... G02B 7/08; G02B 7/09; G02B 7/04; G03B 3/10; H04N 5/2254
USPC ......................................................... 359/824
See application file for complete search history.

(56) References Cited

U.S. PATENT DOCUMENTS

| | | | |
|---|---|---|---|
| 2007/0280668 A1 | 12/2007 | Kubo et al. | |
| 2017/0097517 A1* | 4/2017 | Chen ................... | G02B 27/646 |
| 2018/0213131 A1* | 7/2018 | Liu ...................... | H04N 5/2253 |

* cited by examiner

*Primary Examiner* — Mohammed A Hasan
(74) *Attorney, Agent, or Firm* — Muncy, Geissler, Olds & Lowe, P.C.

(57) ABSTRACT

An optical element driving module is provided, including: a casing; a base, including at least one protrusion extending toward the casing, and the protrusion has a side surface, wherein the casing is fixed on the base; a holder for holding an optical element having an optical axis; a driving assembly disposed in the casing for moving the holder relative to the casing and the base; and a plurality of gluing elements disposed between the side surface and the casing, wherein the side surface is parallel to the optical axis.

20 Claims, 19 Drawing Sheets

(51) Int. Cl.
  *G03B 5/00*       (2006.01)
  *G03B 17/02*      (2006.01)

LENS DRIVING MODULE WITH CASING HAVING PLASTIC MATERIAL AND ASSEMBLY METHOD THEREOF

CROSS REFERENCE TO RELATED APPLICATIONS

This application is a Continuation of application Ser. No. 15/880,013, filed on Jan. 25, 2018, which claims priority of Taiwan Patent Application No. 106102855, filed on Jan. 25, 2017, the entirety of which is incorporated by reference herein.

BACKGROUND OF THE INVENTION

Field of the Invention

The application relates in general to a lens driving module and the assembly method thereof, and in particular to a lens driving module including a base having a plurality of protrusions.

Description of the Related Art

Thanks to ongoing technological developments, recent electronic devices (such as tablet computers and smartphones) usually include a lens module capable of aiding in photography or recording video. In the process of assembling the lens module, there is a sub-process for assembling the casing and affixing it to the base of the lens driving module. However, since a tolerance exists when components are manufactured, when the casing is assembled or attached to the surface of the base, the contact surface between them can become tilted or skewed, which will negatively impact the proper operation of the lens module. In addition, the opening of the casing usually requires additional space for a tool to apply glue to the components in the casing for the purpose of connecting them, but this tends to allow external dust and particles to enter the lens unit during the assembly process, thereby leading to damage of the lens module.

BRIEF SUMMARY OF INVENTION

To address the deficiencies of conventional products, an embodiment of the invention provides a lens driving module configured to drive an optical lens, including a holder, a casing, a base, an electromagnetic driving assembly and a glue. The optical lens is disposed in a receiving space of the holder. The holder is disposed between the casing and the base. The casing has a plastic material. The electromagnetic driving assembly is disposed between the holder and the casing for moving the holder. The base has a plurality of protrusions extending toward the casing, and each of the protrusions has a side surface. The glue is disposed between the side surfaces and the casing, wherein the side surface is parallel to the central axis of the optical lens.

In some embodiments, the side surfaces of the protrusions respectively have a first surface and a second surface that are perpendicular to each other and an angled surface that is angled relative to the first and second surfaces, wherein a gap is formed between the casing and the first, second, and angled surfaces.

In some embodiments, the lens driving module further comprises a first elastic element and a second elastic element, and the base further has a main body from which the protrusions protrude, wherein the first elastic element connects the holder to the main body, and the second elastic element connects the protrusions to the holder.

In some embodiments, the base has a rectangular structure, and the second elastic element has a cross section, wherein the cross section passes through the central axis and is parallel to a side of the rectangular structure, and the cross section only includes one section of the second elastic element on the opposite side of the central axis.

In some embodiments, the holder has a connecting surface connecting the second elastic element, and the connecting surface and the casing at least partially overlap in the direction of the central axis.

In some embodiments, the casing has a plurality of grooves which are formed on an inner surface of the casing and which are configured to receive the glue.

In some embodiments, the electromagnetic driving assembly includes at least one magnetic element disposed on an inner side of the casing, and the protrusions are situated in the casing.

In some embodiments, each protrusion has a positioning bump. The second elastic element has a plurality of locating holes, and the positioning bumps are correspondingly incorporated within the locating holes.

An embodiment of the invention provides a method for assembling a lens driving module, including assembling a holder on a first elastic element, wherein the holder is configured to hold an optical lens; assembling the holder and the first elastic element on a base; assembling a second elastic element on a plurality of protrusions of the base; applying a glue to the inner surface of a casing; and disposing the casing around the base, wherein the glue flows to side surfaces of the protrusions from the inner surface, and the side surfaces are parallel to the central axis of the optical lens.

In some embodiments, the method for assembling the lens module further includes attaching the second elastic element to the protrusions and the holder before disposing the casing around the base.

In some embodiments, the inner surface has a plurality of grooves, and the glue is applied between the grooves and a sidewall of the casing.

Another embodiment of the invention provides a lens driving module configured to drive an optical lens, including a holder, a casing, a base, an electromagnetic driving assembly, a glue, and a sensing assembly. The optical lens is disposed in a receiving space of the holder. The casing has a plastic material. The holder is disposed between the casing and the base. The base has a plurality of protrusions extending toward the casing, and each of the protrusions has a side surface. The electromagnetic driving assembly is disposed between the holder and the casing for forcing the holder and the optical lens to move relative to the base. The glue is disposed between the side surfaces and the casing, wherein the side surface is parallel to the central axis of the optical lens. The sensing assembly is disposed on the casing and configured to sense the relative position of the holder and the base.

In some embodiments, the sensing assembly is formed on the inner wall of the casing by insert Molding or 3D molded interconnect device technology.

In some embodiments, the casing defines a main body and a first sub-sidewall, the first sub-sidewall is detachably connected to the main body, and the sensing assembly is disposed on the first sub-sidewall.

In some embodiments, there is a slit between the casing and the base when the casing is assembled on the base, and the sensing assembly is able to pass through the slit to connect with the casing.

In some embodiments, the casing has a holding portion, the holding portion and the sidewall of the casing define a receiving recess configured to receive the sensing assembly.

In some embodiments, a cross section of the receiving recess forms a U-shaped structure.

Another embodiment of the invention provides a lens driving module configured to drive a plurality optical lenses, including a first holder, a second holder, a casing, a base, an electromagnetic driving assembly and a sensing assembly. The first and the second holders are configured to sustain a first optical lens and a second optical lens, respectively. The casing has a plastic material. The base is connected to the casing, wherein a receiving space is defined by the casing and the base, and the first and second holders are disposed in the receiving space. The electromagnetic driving assembly is disposed in the receiving space and configured to force the first and second holders to move relative to the base. The sensing assembly is disposed on the casing and configured to sense the relative position of the first and second holders and the base.

In some embodiments, the lens driving module further comprises a permeability element disposed between the casing and the first and second holders and configured to correspond to the electromagnetic driving assembly.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the lens driving modules are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Embodiment 1

Figure 1:
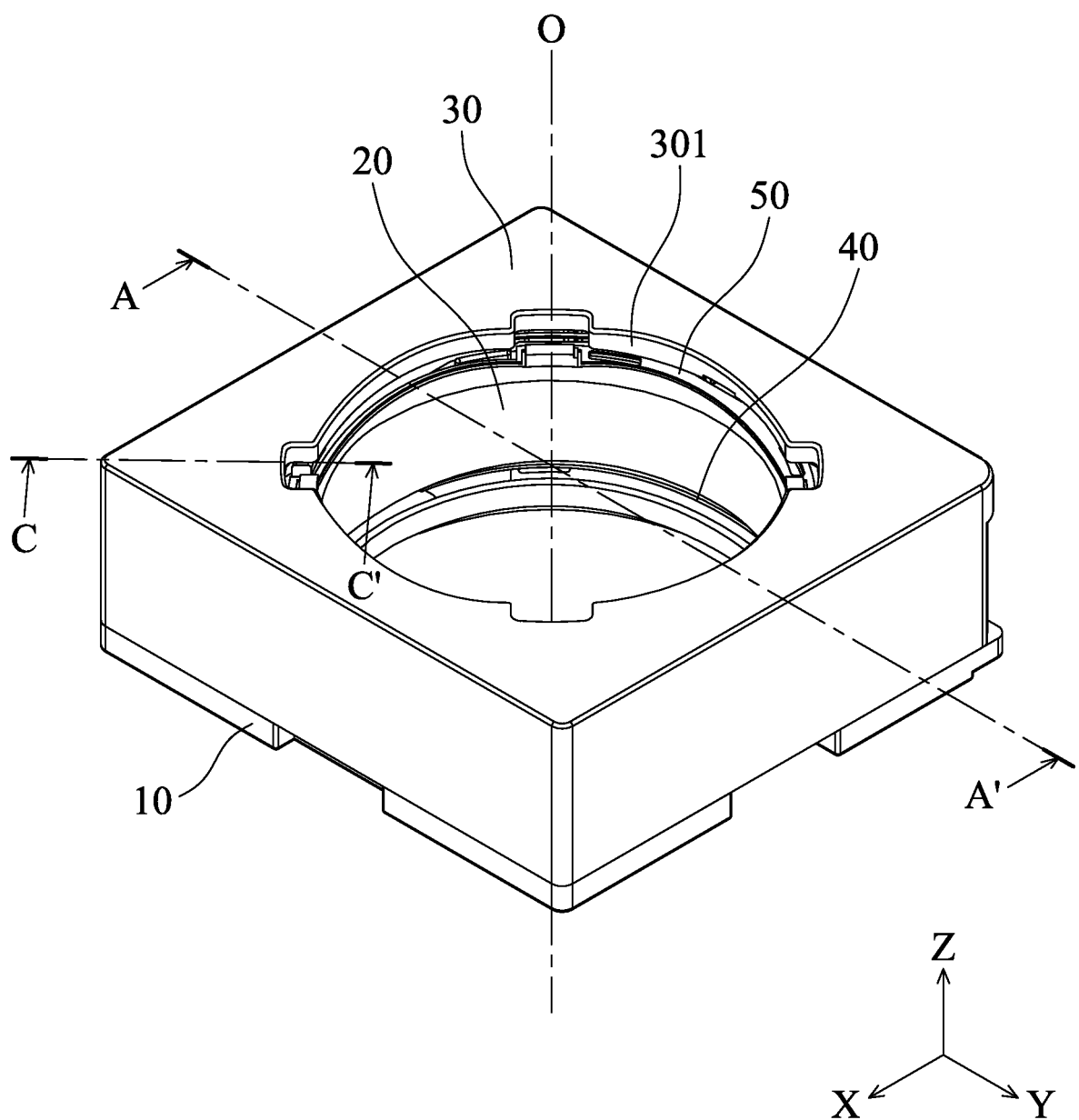
FIG. 1 is a schematic diagram of a lens driving module according to an embodiment of the invention.
Figure 2A:
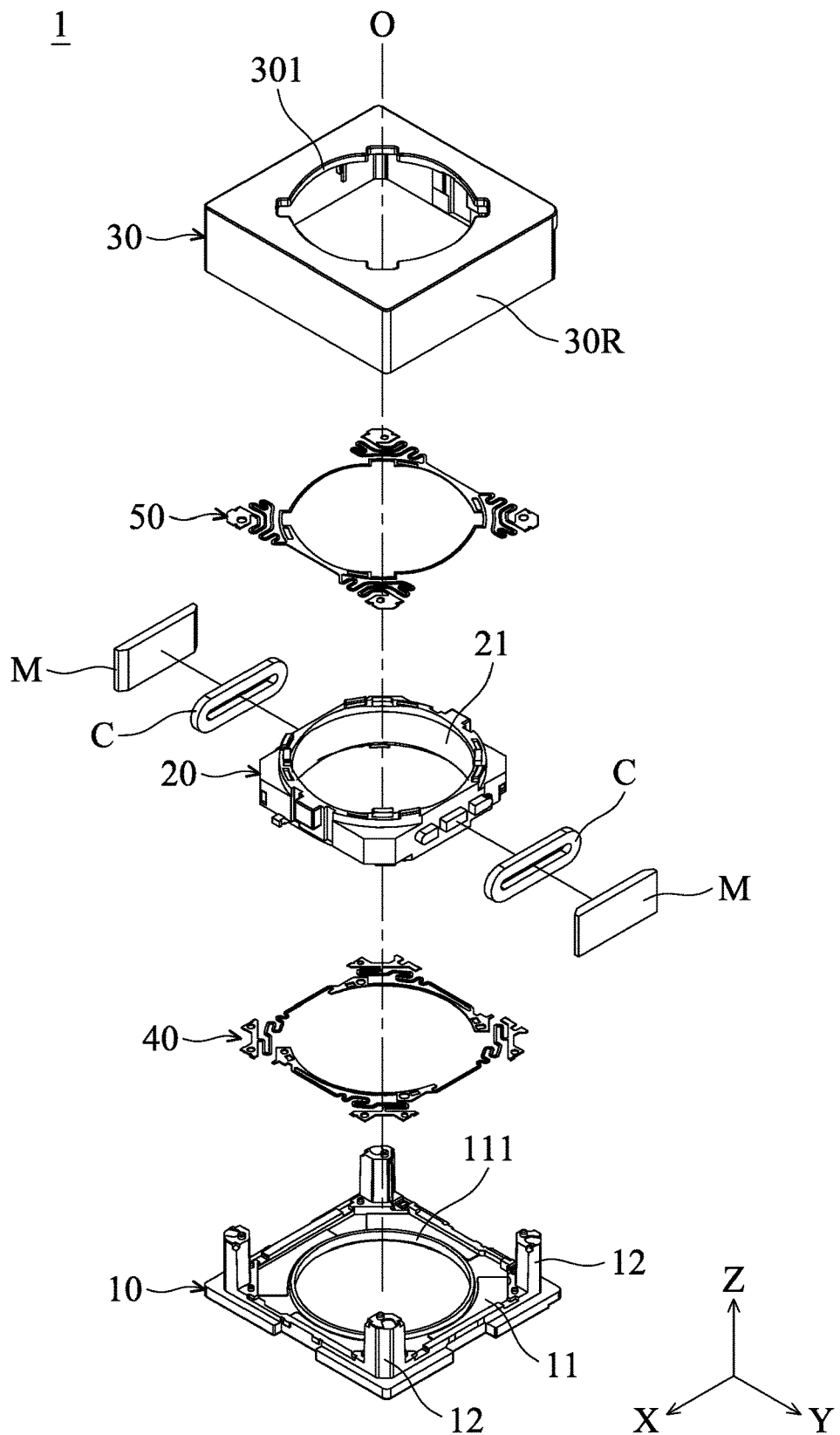
FIG. 2A is an exploded view of the lens driving module in FIG. 1.
Figure 2B:
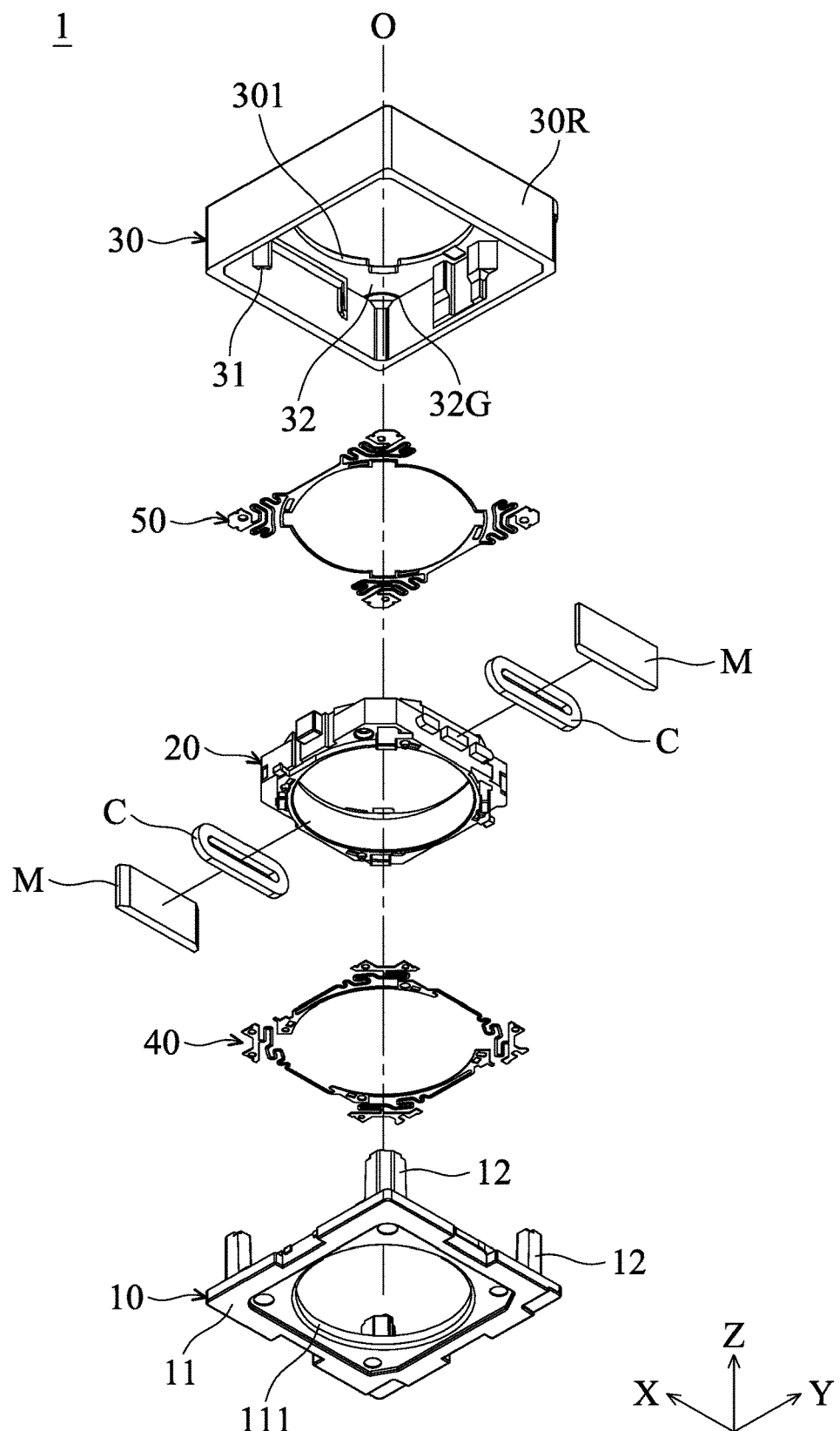
FIG. 2B is another exploded view of the lens driving module in FIG. 1.

FIG. 1 is a schematic diagram of a lens driving module 1 according to an embodiment of the invention, and FIGS. 2A and 2B are exploded view diagrams of the lens driving module 1. The lens driving module 1 can be disposed in an electronic device, such as a camera, a tablet computer, or a cell phone, and it can be configured with an optical lens (not shown) therein. The lens driving module 1 can force the optical lens to move relative to an image sensor disposed in the electronic device, so that the focal length of the optical lens can be adjusted, to achieve the function of auto-focusing (AF).

As shown in FIGS. 1, 2A, and 2B, the lens driving module 1 primarily comprises a base 10, a holder 20, a casing 30 (having a plastic material, wherein the plastic material may contain substances such as ceramics, fibers or metals as a filler), a first elastic element 40, a second elastic element 50, a plurality of coils C, and a plurality of magnetic elements (such as magnets) M. The holder 20 has a receiving space 21 and an optical lens (not shown) can be disposed therein. An electromagnetic assembly is consist of the coils C and the magnetic elements M, configured to force the holder 20 and the optical lens to move relative to the base 10. The coils C are disposed on the sides of the holder 20 and have an elliptical structure respectively. The magnetic elements M are respectively disposed in a recess 31 of the casing 30 and face the coils C, wherein the recesses 31 are formed on the inner side of the casing 30. In some embodiments, the coils C may electronically connect to an external circuit to receive electric current via the first elastic element 40 and electronic pins (not shown), so that a magnetic force is provided between the coils C and the magnetic elements M to force the holder 20 to move with respect to the base 10 along a central axis O of the optical lens (Z-axis).

Figure 3A:
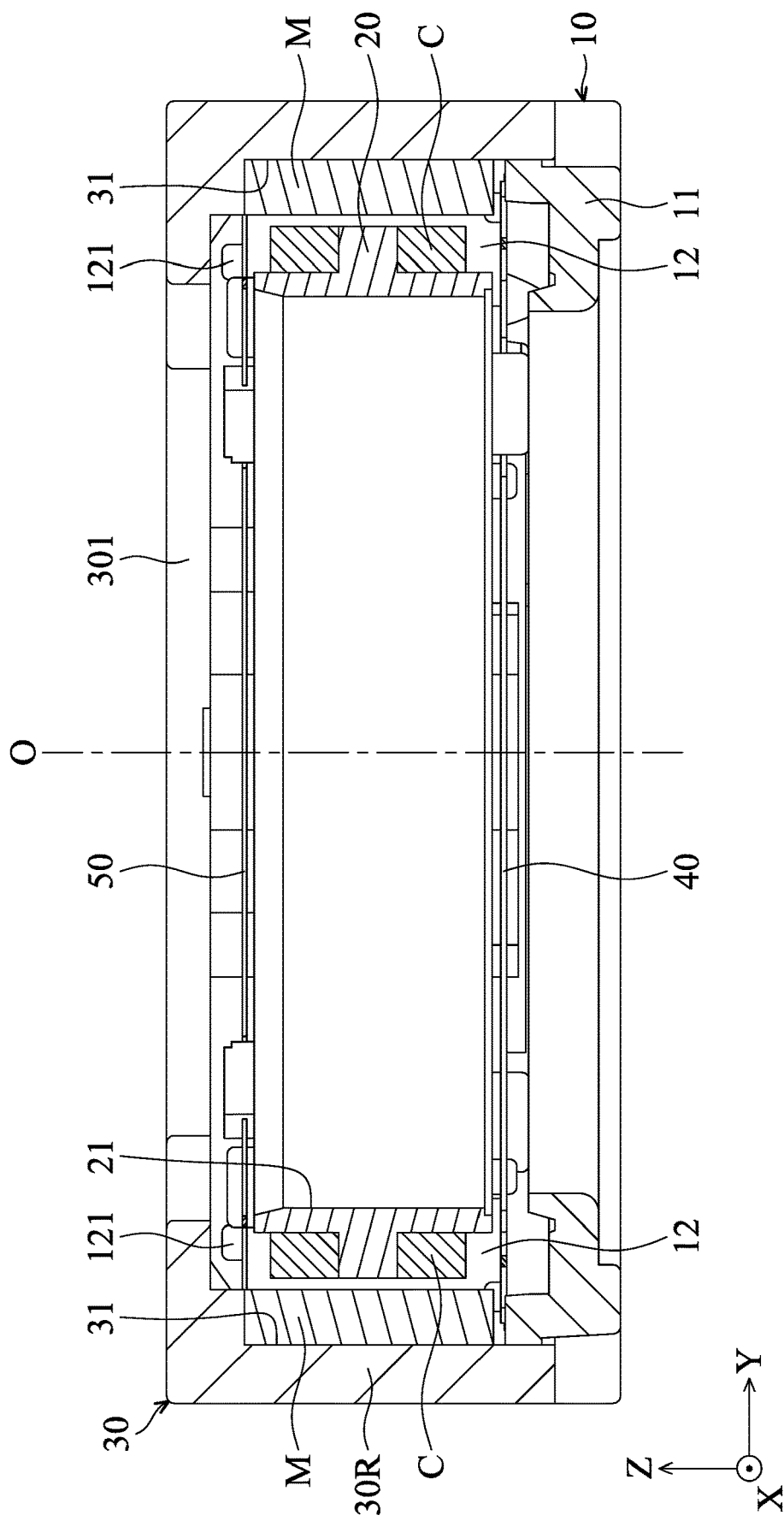
FIG. 3A is a sectional view diagram taken along line A-A' in FIG. 1.

Referring to FIGS. 2A and 3A, FIG. 3A is sectional view diagram of the lens driving module 1 taken along line A-A' in FIG. 1. The holder 20 is disposed between the base 10 and the casing 30, wherein the base 10 includes a main body 11 and plurality of protrusions 12. The main body 11 has a substantially rectangular structure and an opening 111 extends through the main body 11. The opening 111 is aligned with the central axis O of the optical lens, and the four protrusions 12 are arranged in four corners of the main body 11 and protrude from the main body 11 toward the casing 30. The first elastic element 40 is disposed on the main body 11 of the base 10 and connects the lower surface of the holder 20 and the main body 11. The second elastic element 50 is disposed on the protrusions 12 of the base 10 and the holder 20 and connects the protrusions 12 to the upper surface of the holder 20. The holder 20 is disposed between the first and second elastic elements 40 and 50. In an embodiment, the first and second elastic elements 40 and 50 are leaf springs having metal material. It should be understood that the electromagnetic drive assembly consisting of the coils C and the magnetic elements M may be disposed between the holder 20 and the casing 30, configured to force the holder 20 and the optical lens relative to the base 10 to move.

Figure 4A:
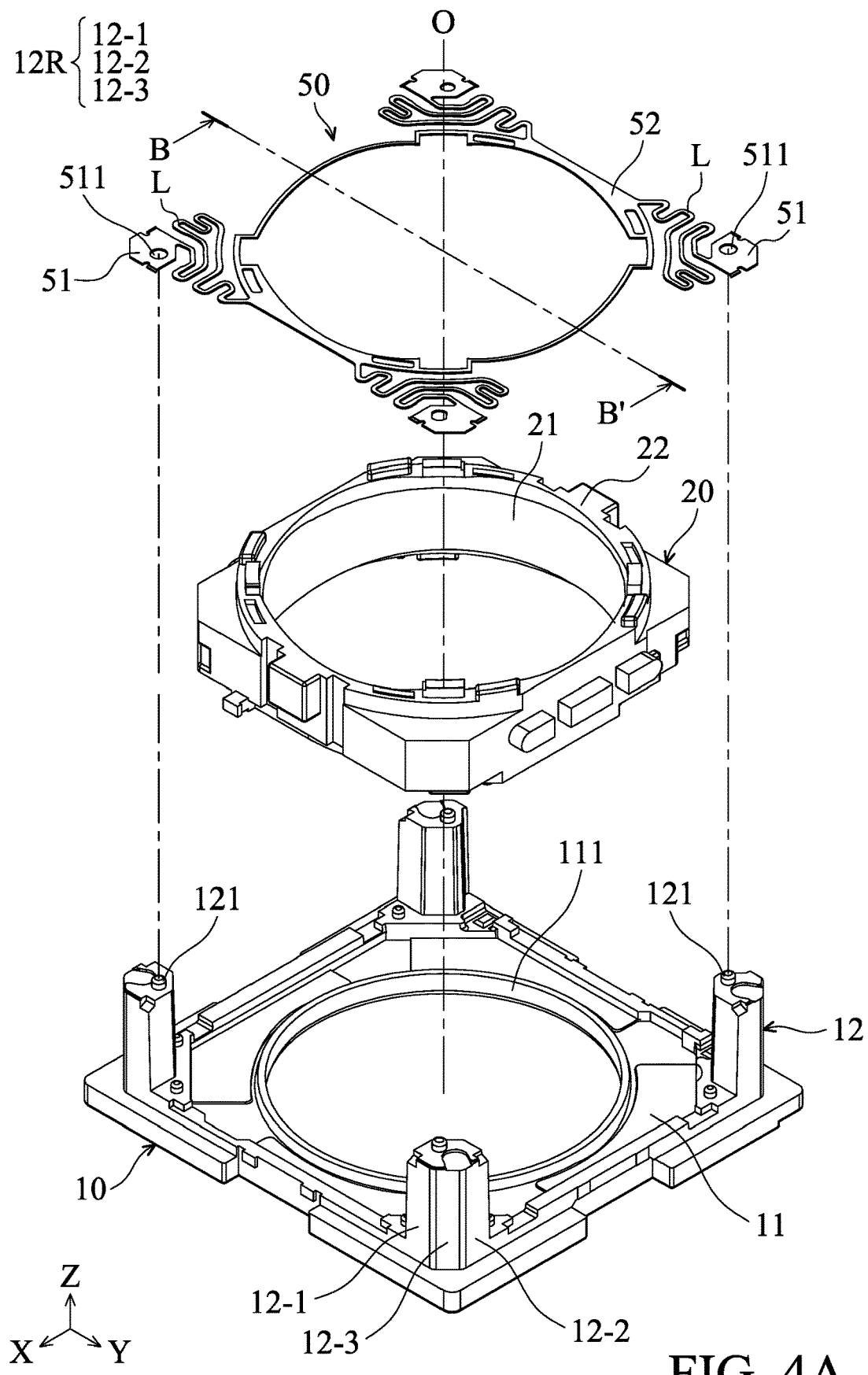
FIG. 4A is a schematic diagram of the base, holder and the second elastic element in FIGS. 2A-2B.

Please refer to FIG. 4A, which is a schematic diagram of the second elastic element 50, the holder 20, and the base 10. The second elastic elements 50 include a plurality of fixing portions 51, a connecting portion 52 with a substantial circle structure (from top view), and a plurality of arms L. The fixing portions 51 connect the connecting portion 52 via the arms L. When the second elastic element 50 is disposed on the holder 20 and the base 10, a locating hole 511 of each fixing portion 51 is correspondingly bonded to a positioning bump 121 of each protrusion 12 of the base 10, so that the second elastic element 50 is steady assembled to the base 10, and the connecting portion 52 of the second elastic element 50 connects a connecting surface 22 of the holder 20. The method of connection, for example, may be engagement or adhesive bonding. The connecting surface 22 is substantially circular from the top view.

Figure 4B:
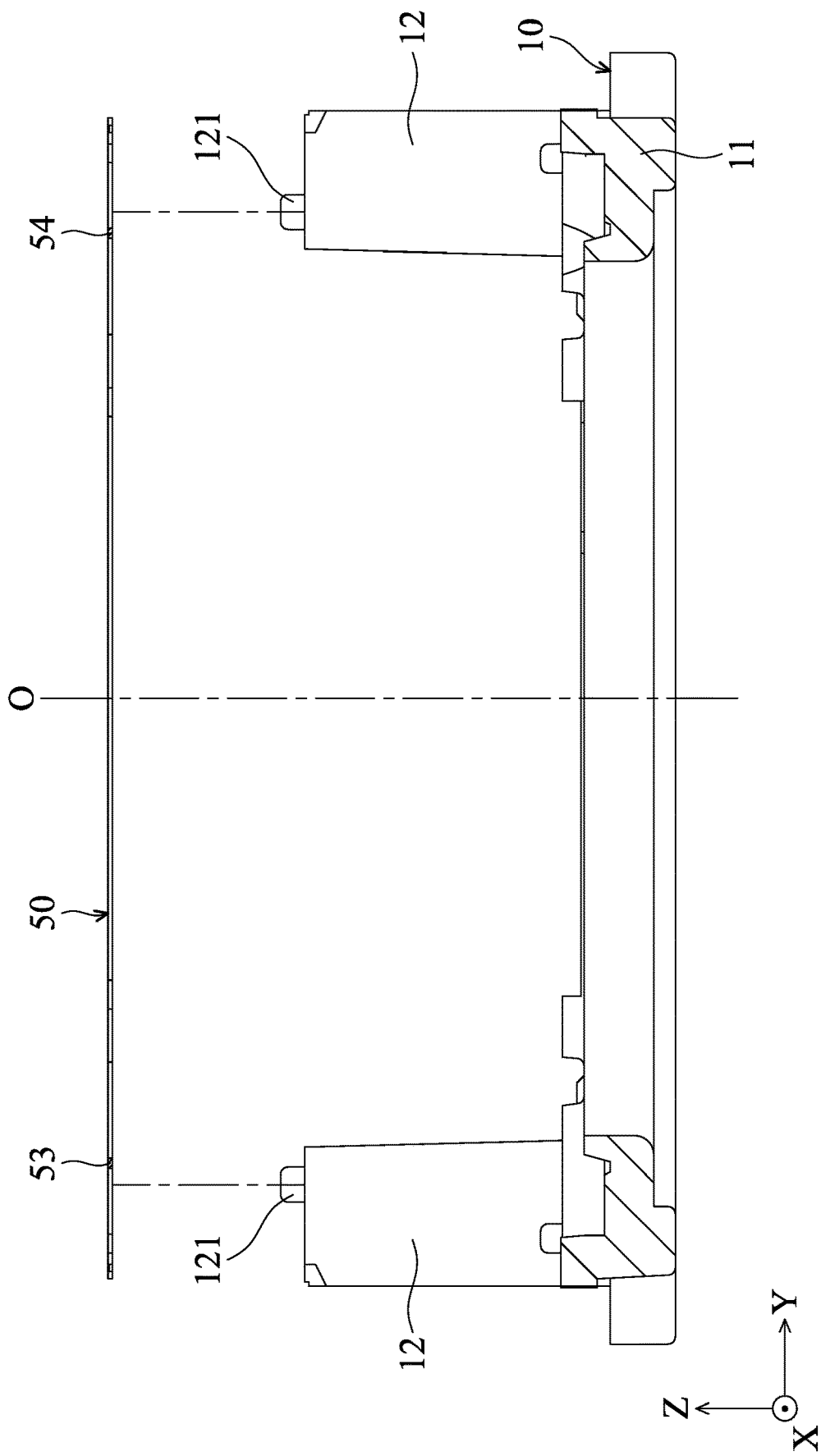
FIG. 4B is a sectional view diagram taken along line B-B' in FIG. 4A (the holder 20 is omitted).

As shown in FIG. 4B, which is a sectional view diagram taken along line B-B' in FIG. 4A (the holder 20 is omitted), line B-B' passes through the central axis O and is parallel to the lateral side of the main body 11. It can be seen from FIGS. 4A and 4B that only two sections 53 and 54 (indicated by cross hatching lines) of the connecting portion 52 of the second elastic element 50 are cut by the cross section (line B-B') of the second elastic element 50 on the opposite sides of central axis O. In other words, each of the four sides of the second elastic element 50 in the present embodiment is formed with only a single layer of an elastic arm. Therefore, when the lens driving module 1 forces the optical lens to move, the degree of deformation of the second elastic element 50 can be reduced, so that the space occupied by the second elastic element 50 may be decreased in the lens driving module 1.

Continuing with reference to FIG. 4A, the side surfaces 12R of each protrusion 12 of the base 10 includes a first surface 12-1, a second surface 12-2, and an angled surface 12-3. The first surface 12-1 and the second surface 12-2 are perpendicular to each other, and the angled surface 12-3 is angled with respect to the first surface 12-1 and the second surface 12-2. When the casing 30 is assembled to the base 10, a gap G is formed between the side surfaces 12R (including the first surface 12-1, the second surface 12-2, and the angled surface 12-3) and the sidewall 30R of the casing 30, wherein a glue (or a viscose) (e.g., a glue having a resin) may be applied to the gap G so that the casing 30 can be attached securely to the base 10.

Figure 3B:
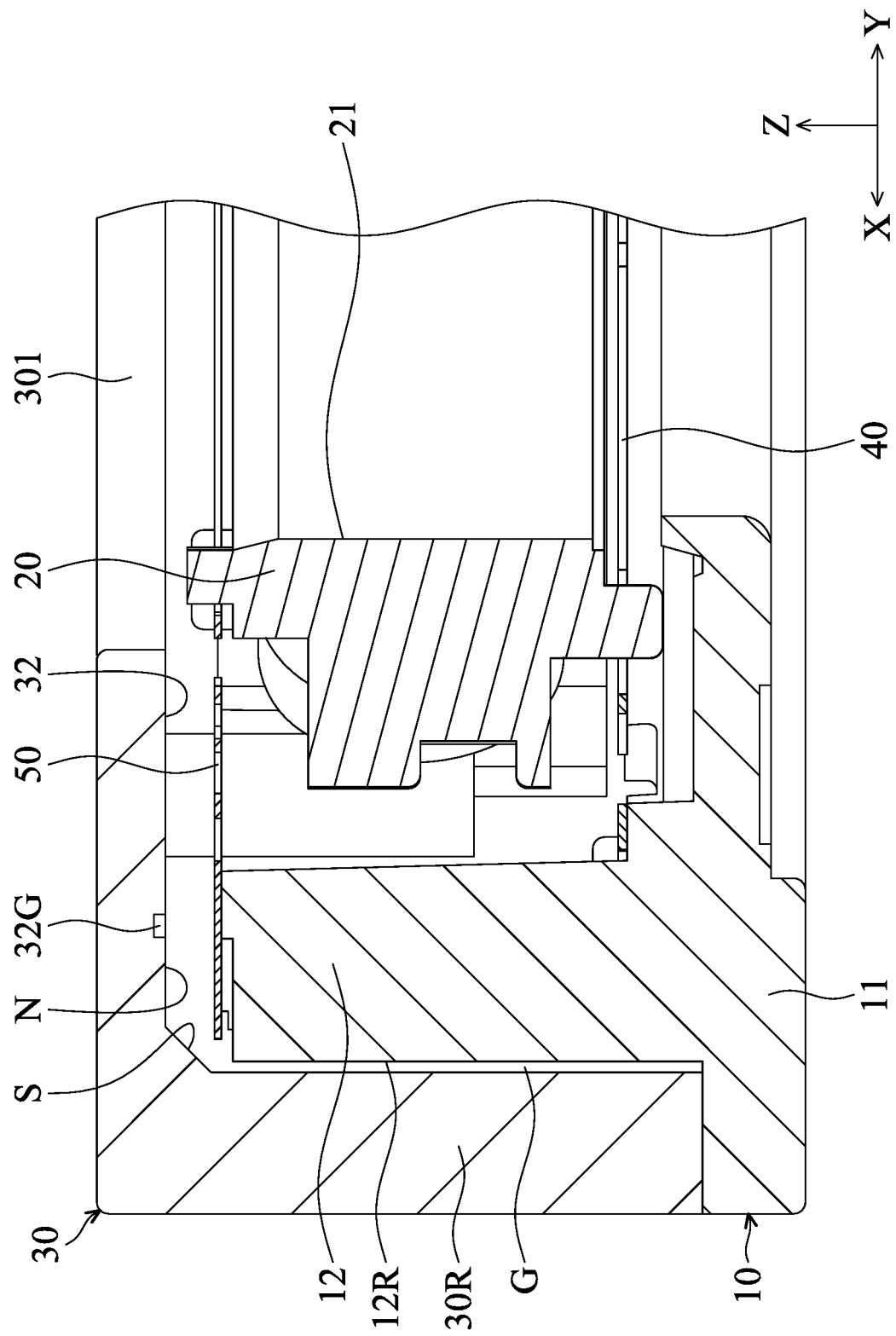
FIG. 3B is a sectional view diagram taken along line C-C' in FIG. 1.
Figure 5:
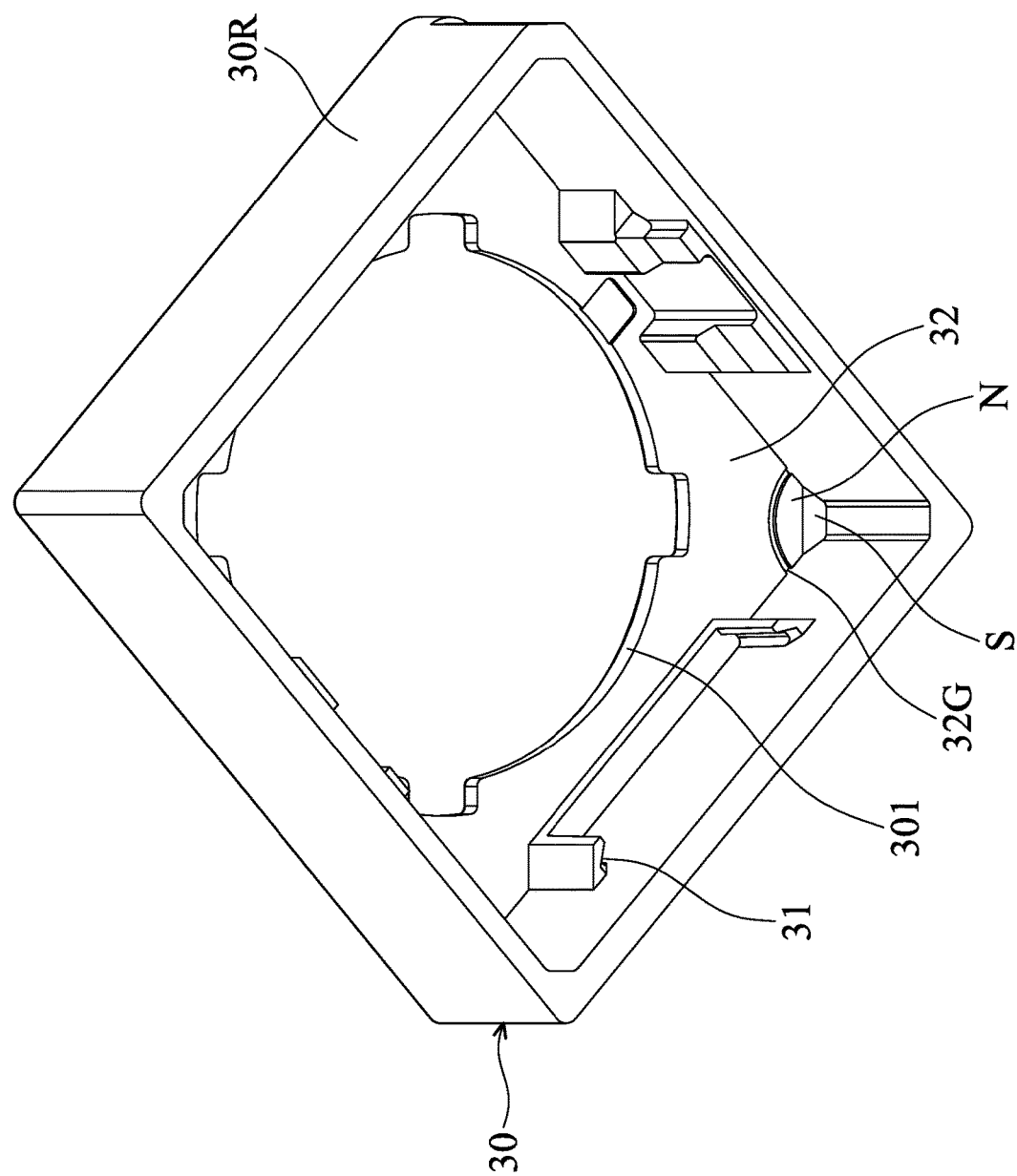
FIG. 5 is a schematic diagram of the casing in FIGS. 2A-2B.

FIG. 5 is a schematic diagram of the casing 30. The casing 30 has a substantially rectangular structure in which an opening 301 passes through and is aligned with the central axis O of the optical lens (FIG. 2A). The casing 30 has an inner surface 32 surrounded by and the sidewall 30R, wherein a plurality of grooves 32G are formed on the inner surface 32 and respectively adjacent to the four corners of the inner surface 32. The grooves 32G have arcuate structures. In addition, a sector-shaped corner area N is formed between the sidewall 30R and the groove 32G, and the glue may be placed or applied thereto. When the casing 30 is assembled to the base 10, as shown in the cross-sectional view of FIG. 3 taken along line C-C' in FIG. 1, the glue flows from the corner area N along the guide surface S (angled with respect to the inner surface 32) into the gap G between the casing 30 and the base 10, and then it flows to the side surface 12R of the protrusion 12 of the base 10. Therefore, the first surface 12-1, the second surface 12-2, and the angled surface 12-3 of the protrusion 12 are effectively connected to the sidewall 30R by the glue, so that the casing 30 and the base 10 are securely assembled. As a result, the entire structural strength of the lens driving module 1 can be enhanced by the surfaces 12-1, 12-2, and 12-3 as the bonding surfaces of the casing 30 and the base 10. Moreover, since the inner surface 32 of the casing 30 is provided with a groove 32G which can be used to contain and restrict the glue from overflowing, when the glue is applied to the corner area N or during the assembly of the casing 30 and the base 10, it is possible to prevent the glue from flowing toward the center of the inner surface 32 or the center of the opening 111 of the base 10, thereby effectively preventing damage to the optical lens.

Figure 6B:
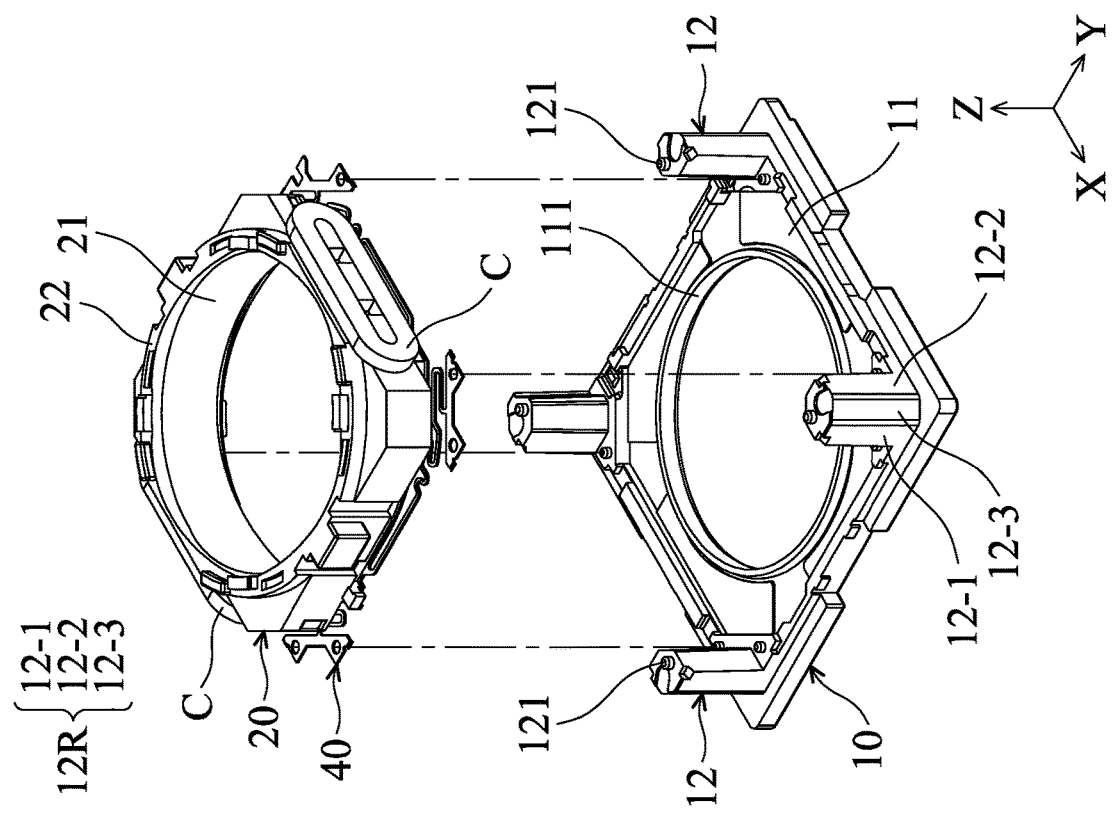
FIGS. 6A to 6E are schematic diagrams of assembly of the lens driving module.
Figure 6A:
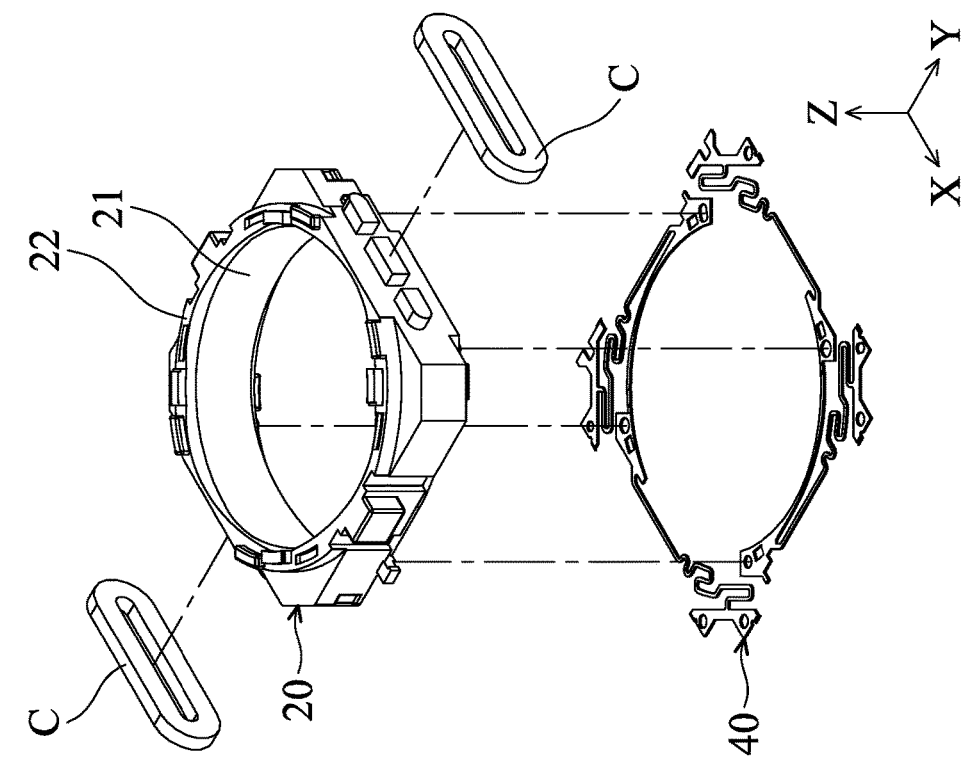
Figure 6D:
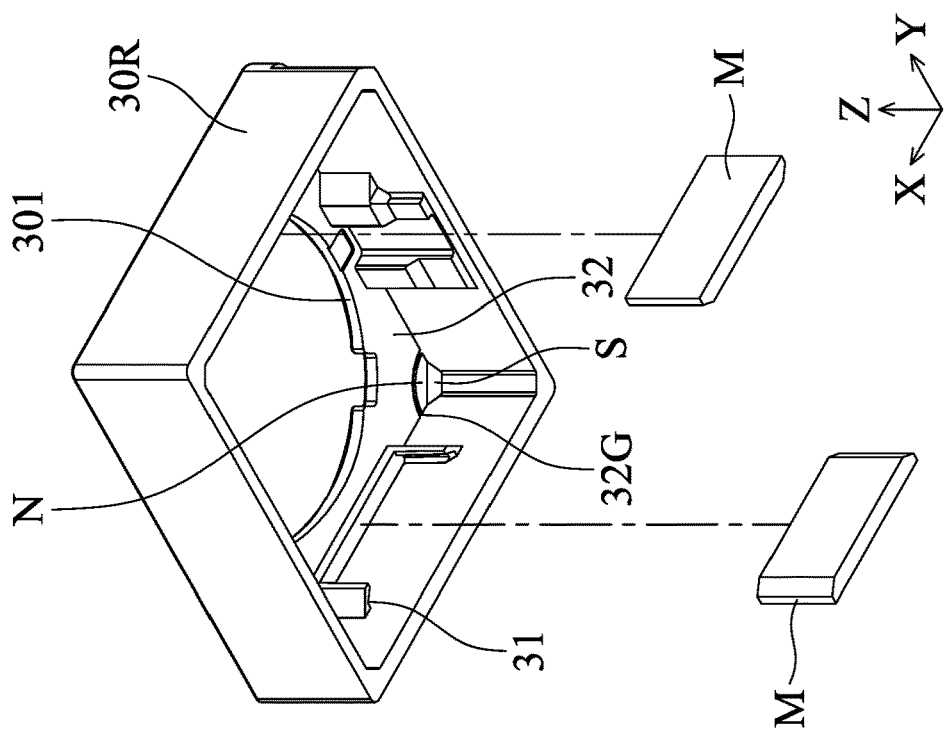
Figure 6C:
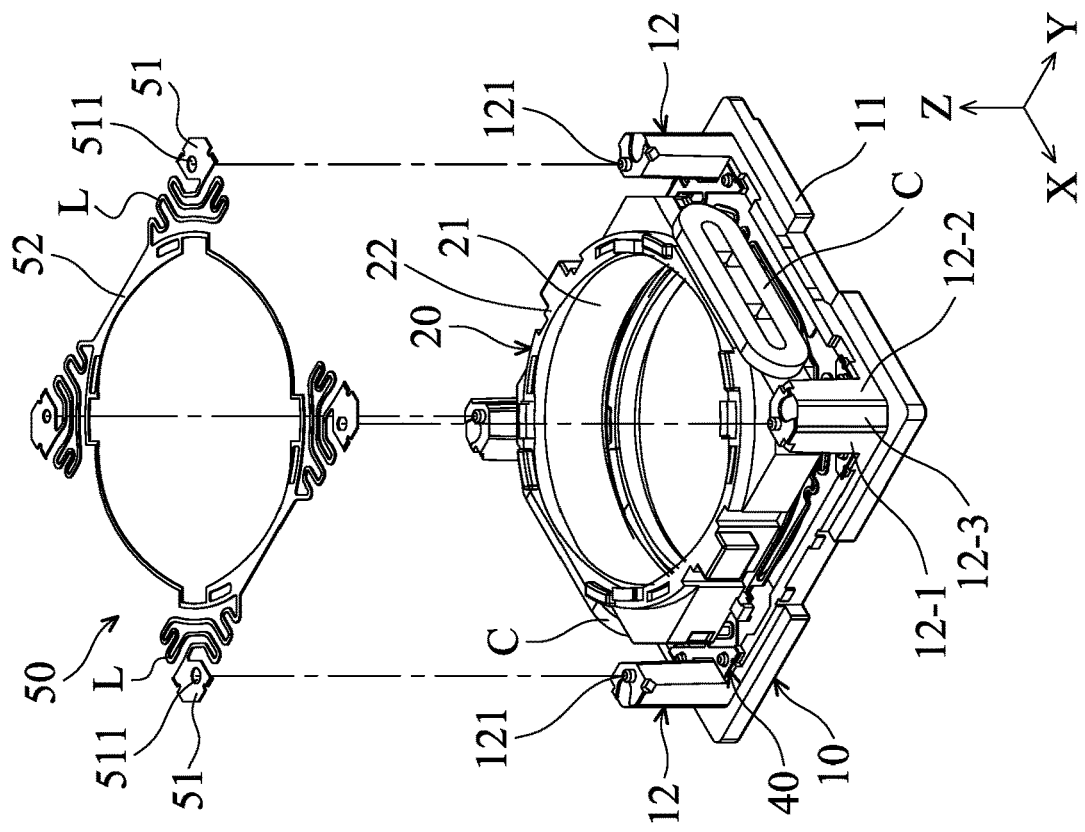
Figure 6E:
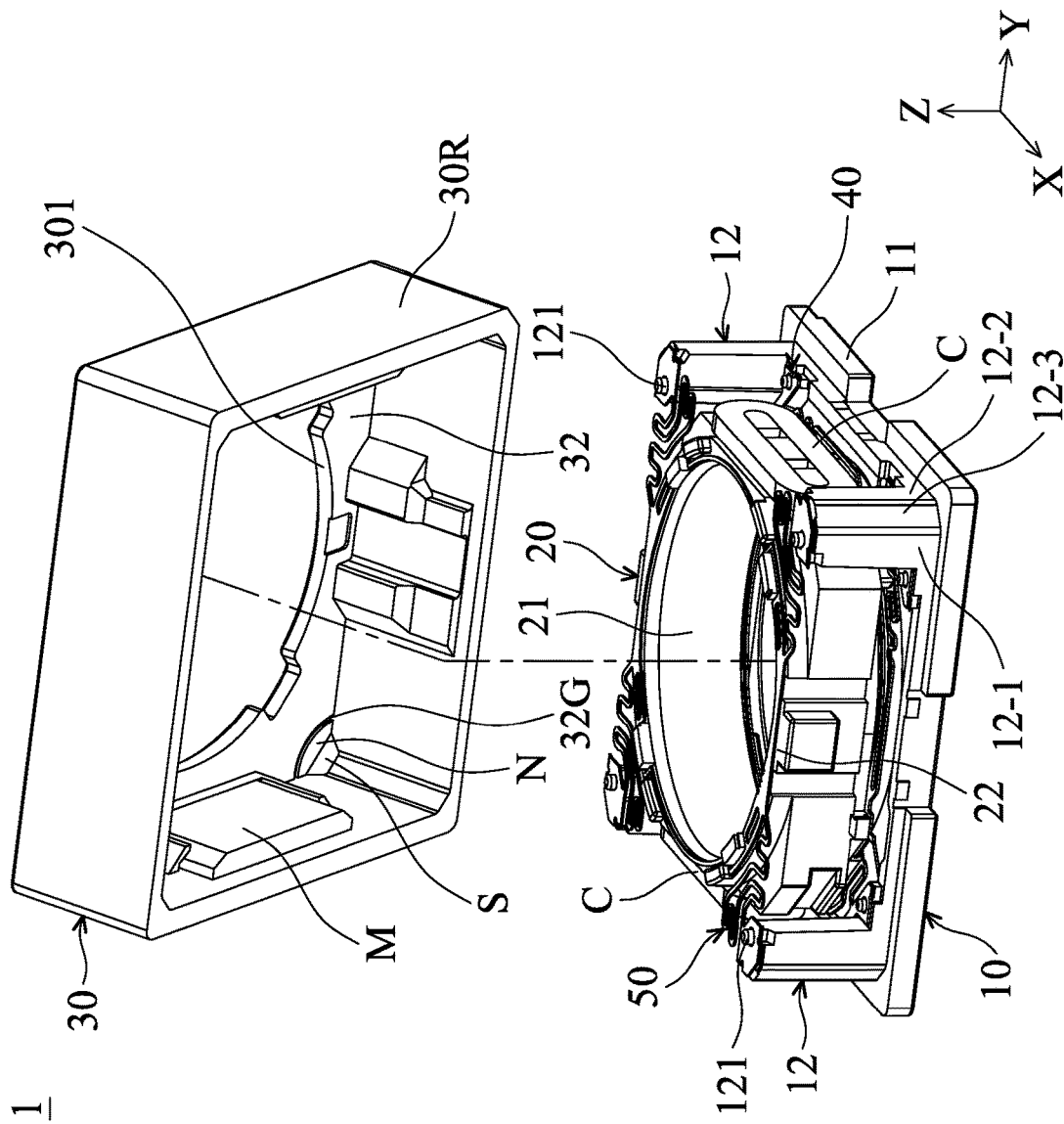

The assembly method of the lens driving module 1 is described with reference to FIGS. 6A to 6E. First, as shown in FIG. 6A, the coils C are assembled to the holder 20, and the holder 20 is disposed on the first elastic element 40, wherein the holder 20 is connected with a portion of the first elastic element 40. The connection method, for example, may be engagement or adhering. Next, as shown in FIG. 6B, the holder 20 and the first elastic element 40 are assembled to the base 10, wherein a portion of the first elastic element 40 is connected to the main body 11 of the base 10. Then, as shown in FIG. 6C, the second elastic member 50 is provided on the protrusions 12, wherein the positioning bumps 121 of the protrusions 12 may firstly be engaged with the locating holes 511 of the second elastic element 50, and it is selectable to apply a glue in order to facilitate the affixing of the end portions of the second elastic element 50 to the protrusions 12. After that, the connecting surface 22 of the holder 20 and the connecting portion 52 of the second elastic element 50 are connected to each other (the connection method, for example, may be engagement or adhering). Furthermore, as shown in FIG. 6D, the magnetic elements M are mounted in the recesses 31 of the casing 30, and the glue are applied to the corner areas N formed between the sidewall 30R and the groove 32G on the inner surface 32. Finally, as shown in FIG. 6E, the casing 30 is disposed around the base 10. The inner surface 32 of the casing 30 at least partially overlaps the connecting surface 22 of the holder 20 from the direction of the central axis O, wherein the glue applied to the corner areas N flows correspondingly to each of the side surfaces 12R of the protrusions 12 of the base 10. As result, the assembly of the lens driving module 1 is completed. In one embodiment, the step of disposing the magnetic elements M and applying the glue to the casing 30 (FIG. 6C) may be carried out before or after the step of assembling the holder 20 to the first elastic element 40 (FIG. 6A).

Figure 7:
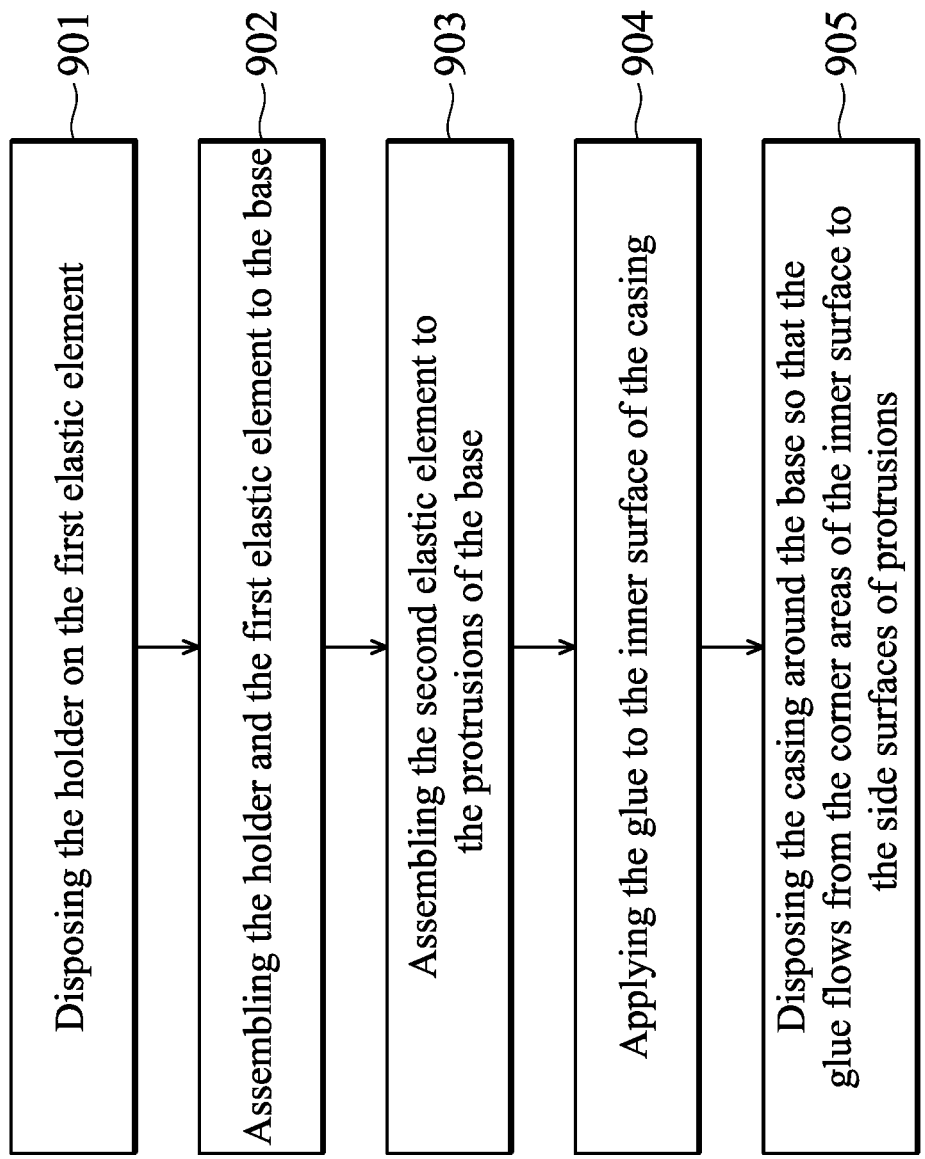
FIG. 7 is a flowchart of a method for assembling a lens driving module according to an embodiment of the invention.

According to the contents of the embodiment (FIGS. 6A to 6E), the present invention provides a method of assembling the lens driving module 1, which mainly includes the steps shown in FIG. 7. The steps include: disposing the holder 20 on the first elastic element 40 (901); assembling the holder 20 and the first elastic element 40 to the base 10 (902), in particular, the first elastic element 40 connecting to the main body 11 of the base 10; assembling the second elastic element 50 to the protrusions 12 of the base 10 (903), wherein locating holes 511 of the second elastic element 50 are correspondingly assembled to the positioning bumps 121 of the protrusions 12; applying a glue to the corner areas N of the inner surface 32 of the casing 30 (904); and disposing the casing 30 around the base 10 (905), so that the glue flows from the corner areas N of the inner surface 32 to the side surfaces 12R of the protrusions 12, and the glue flows in the gaps G between each side surface 12R and the sidewall 30R, thereby securely affixing the casing 30 to the base 10. It should be understood that step 904 of applying the glue to the inner surface 32 of the casing 30 may be performed before, between, or after steps 901~903. A step of assembling the coils C to the holder 20 and the magnetic elements M to the casing 30 may be performed before step 905.

In the present invention, the second elastic element 50 is connected to the protrusions 12 of the base 10 and the holder 20 (the step 903) before the casing 30 is disposed around the base 10 (the step 905), so that there is no need to leave additional space of the opening 301 of the casing 30 for the tool to apply the glue to connect the second elastic element 50 with the holder 20. Thus, the opening 301 can be smaller to avoid or reduce the amount of external dust or particles entering the lens driving module 1.

Embodiment 2

Figure 8A:
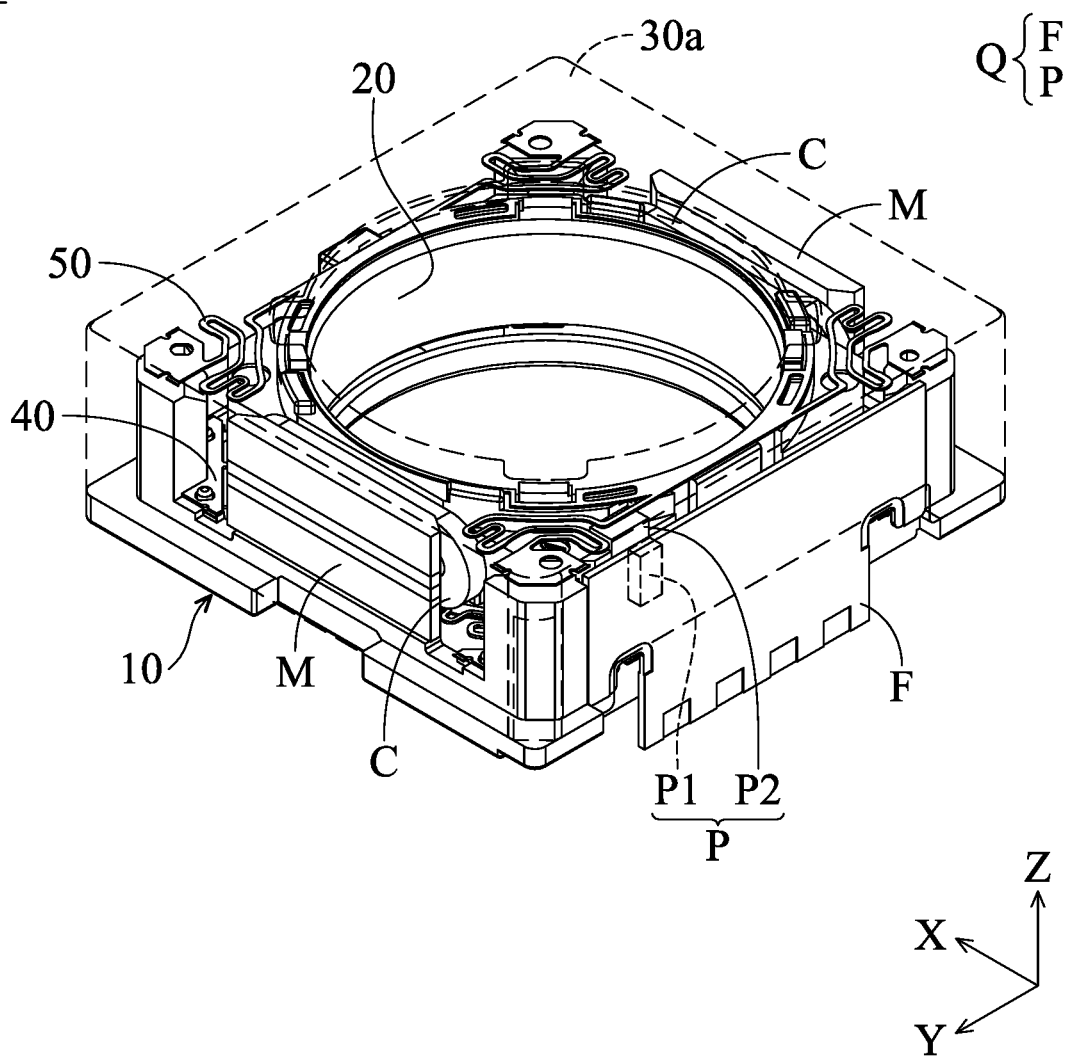
FIGS. 8A and 8B are schematic diagrams of a lens driving module according to another embodiment of the invention.
Figure 8B:
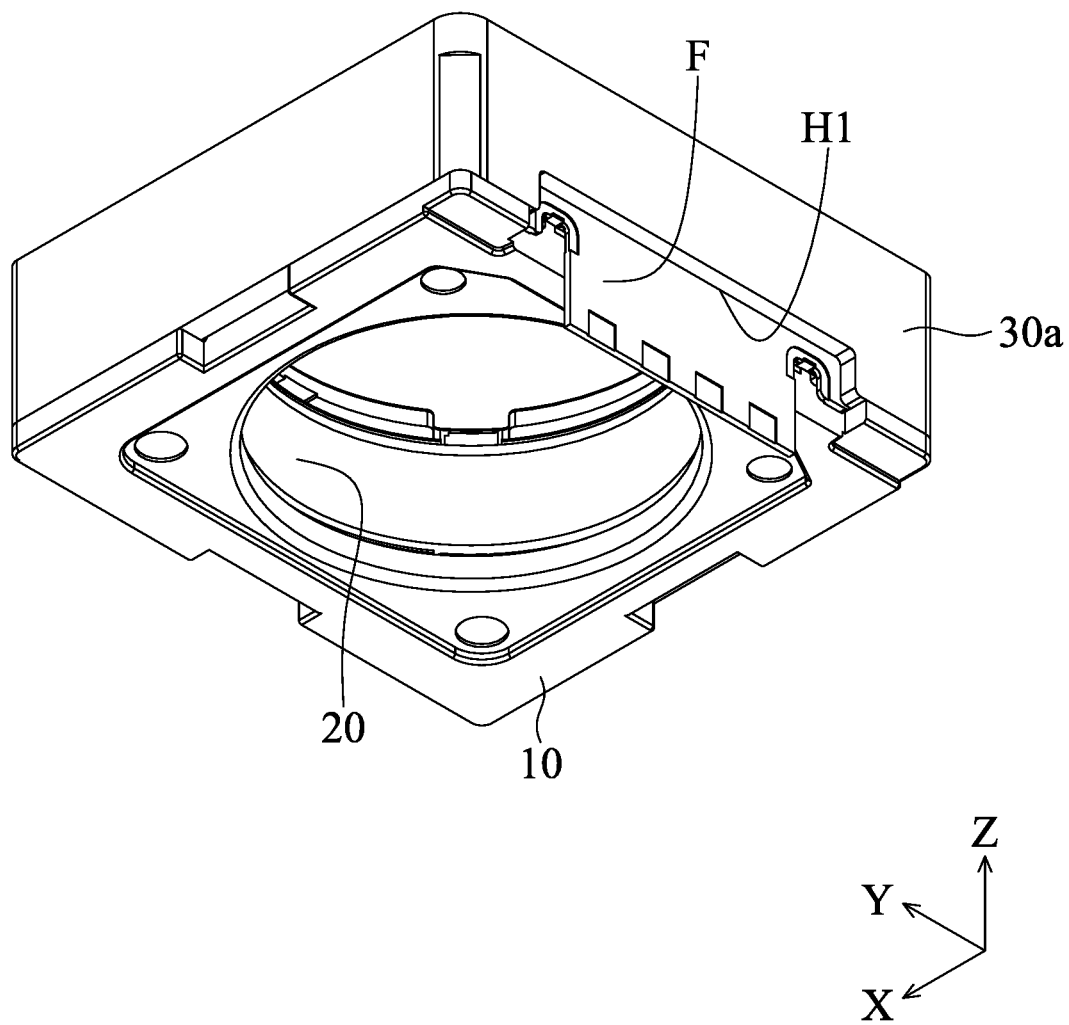

FIGS. 8A and 8B are schematic diagrams of a lens driving module 2 according to another embodiment of the present invention. The main difference between the lens driving module 2 and the aforementioned lens driving module 1 (FIG. 1) is that the lens driving module 2 further comprises a sensing assembly Q disposed in the casing 30a, and the casing 30a and the aforementioned casing 30 have structural differences. Other components are the same or substantially the same or only a slight difference in appearance, they will not repeat them here.

The casing 30a has a plastic material. The sensing element Q is disposed in the casing 30a (an receiving space defined by the casing 30a and the base 10) and includes a circuit board F and a pair of alignment components P (including a first alignment element P1 and a second alignment element P2 matched to each other, which are respectively disposed on the casing 30a and the holder 20). The first alignment element P1 may be one of a permanent magnet and a Hall effect sensor, and the second alignment element P2 being the other of the two. It is possible for the Hall effect sensor to detect the position of the permanent magnet by detecting the change of the magnetic field of the permanent magnet, so as to detect the displacement of the holder 20 and the optical lens provided therein relative to the base 10 due to vibration. In another embodiment, other types of sensing elements/assembly, such as a Magneto-resistive Sensor (MRS) or an optical sensor, may also be used to sense the positional relationship between the holder 20 and the base 10. In this embodiment, the circuit board F and the first alignment member P1 of the sensing assembly Q are disposed on the casing 30a, and the second alignment member P2 of the sensing assembly Q is disposed on the holder 20.

It should be noted that the casing 30a of the present embodiment has a plastic material, the circuit board F and the first alignment member P1 (FIG. 8C) are disposed inside the sub-sidewall 30R1 of the sidewall 30R of the casing 30a, and one or more wires (not shown) may be formed on the sidewall 30R of the casing 30a in a manner of insert molding or 3D molded interconnect device (3D MID) technology to connect the circuit board F, to allow an external power source or other electronic components electrically connected to. Since the wire(s) is/are formed on the casing 30a in the manner of insert molding or 3D MID technology, not only can the number of components of the lens driving module 2 be reduced but also the volume of the whole lens driving module 2 can be greatly reduced, and also simplifying and saving assembly costs. In addition, when the casing 30a of the present embodiment is assembled on the base 10, a slit H1 (corresponding to the receiving recess H2 described below) is formed between the casing 30a and the base 10. As shown in FIG. 8B, the circuit board F of the sensing assembly Q can be inserted from the slit H1 to be connected to the casing 30a so that it can be easily assembled/disassembled by passing through the slit H1.

Figure 8C:
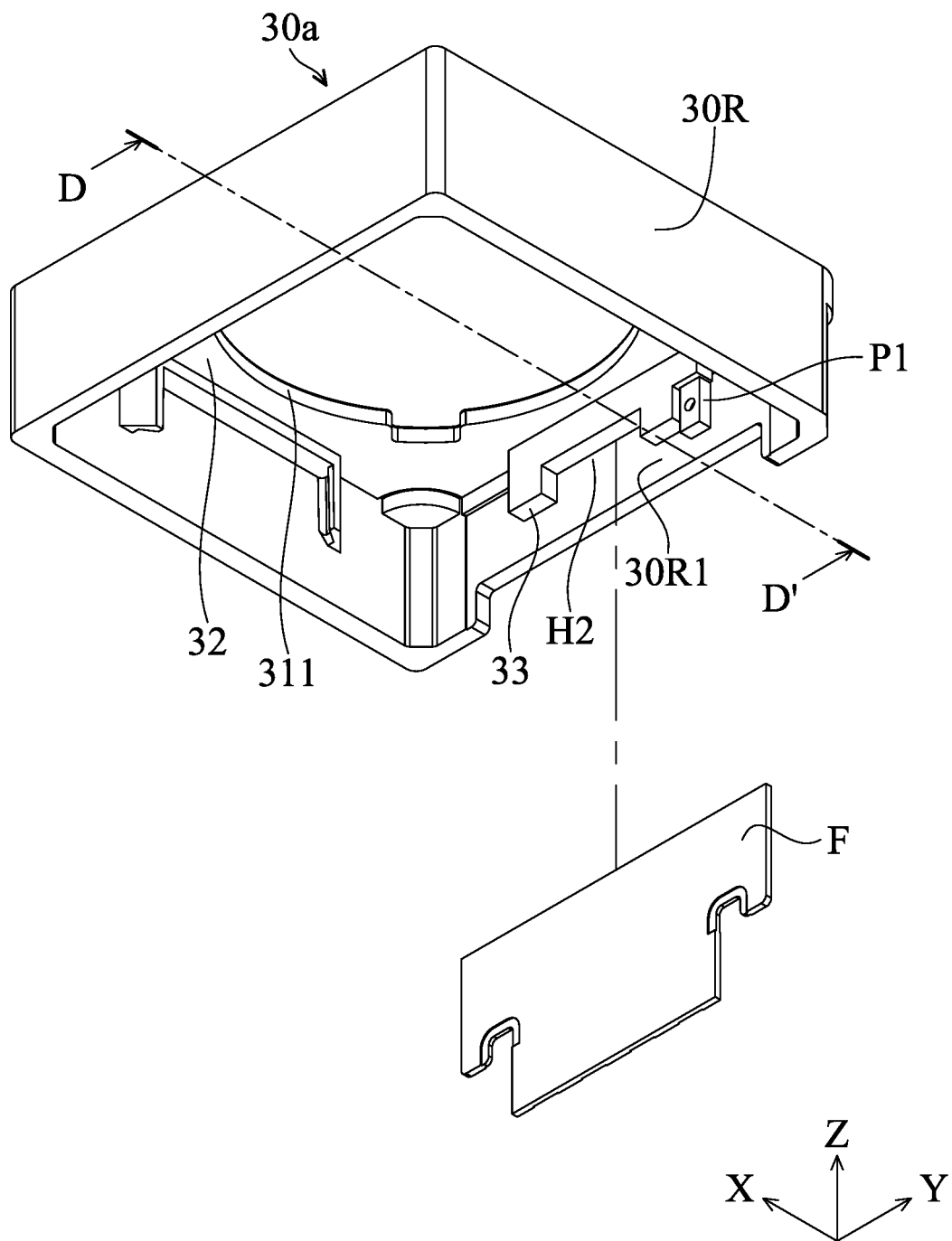
FIG. 8C is a schematic diagram of the configuration of the casing and the sensing assembly.
Figure 8D:
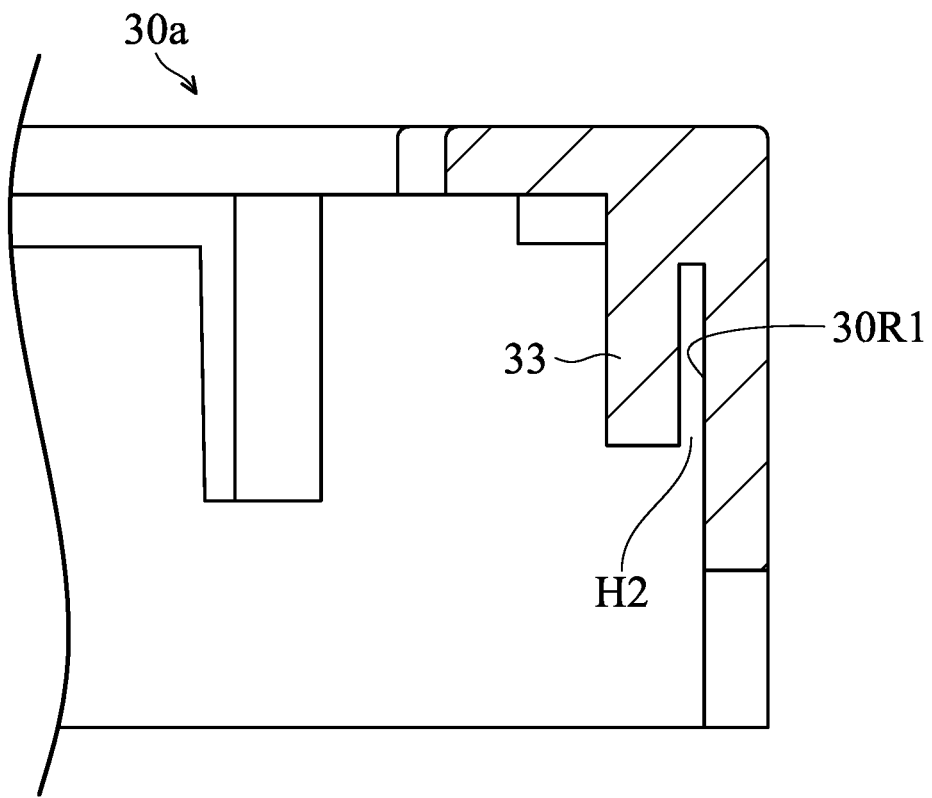
FIG. 8D is a sectional view diagram taken along line D-D' in FIG. 8C.

FIG. 8C shows a more detailed configuration of the casing 30a and the sensing assembly Q. The casing 30a further has a holding portion 33 (or holding/clamping wall) disposed substantially perpendicular to the inner surface 32 and parallel to a sub-sidewall 30R1 of the sidewall 30R. The first alignment element P1 is disposed on the holding portion 33. The sub-sidewall 30R1 of the holding portion 33 and the sidewall 30R defines a receiving recess H2 configured to receive the circuit board F, wherein the cross section of the receiving recess H2 forms a U-shaped structure (FIG. 8D). Therefore, the circuit board F can be easily inserted from the slit H1 (FIG. 8B) to be assembled to the casing 30a (for example, being a manner of engaging) and also easily disassembled (pulling out from the receiving recess H2).

Therefore, by the casing 30a supporting the sensing assembly Q, the module in this embodiment can reduce to set a frame for supporting sensing assembly Q, greatly reduce the overall number of components, and in addition to achieving miniaturization for the purpose of simplifying the assembly process of the whole module by configuring the aforementioned design of the receiving recess H2.

In another embodiment, the circuit board F and the wires may both be formed on the sidewall of the casing 30a in a manner of insert molding or 3D MID technology, to further simplify and save the assembly cost.

Figure 9:
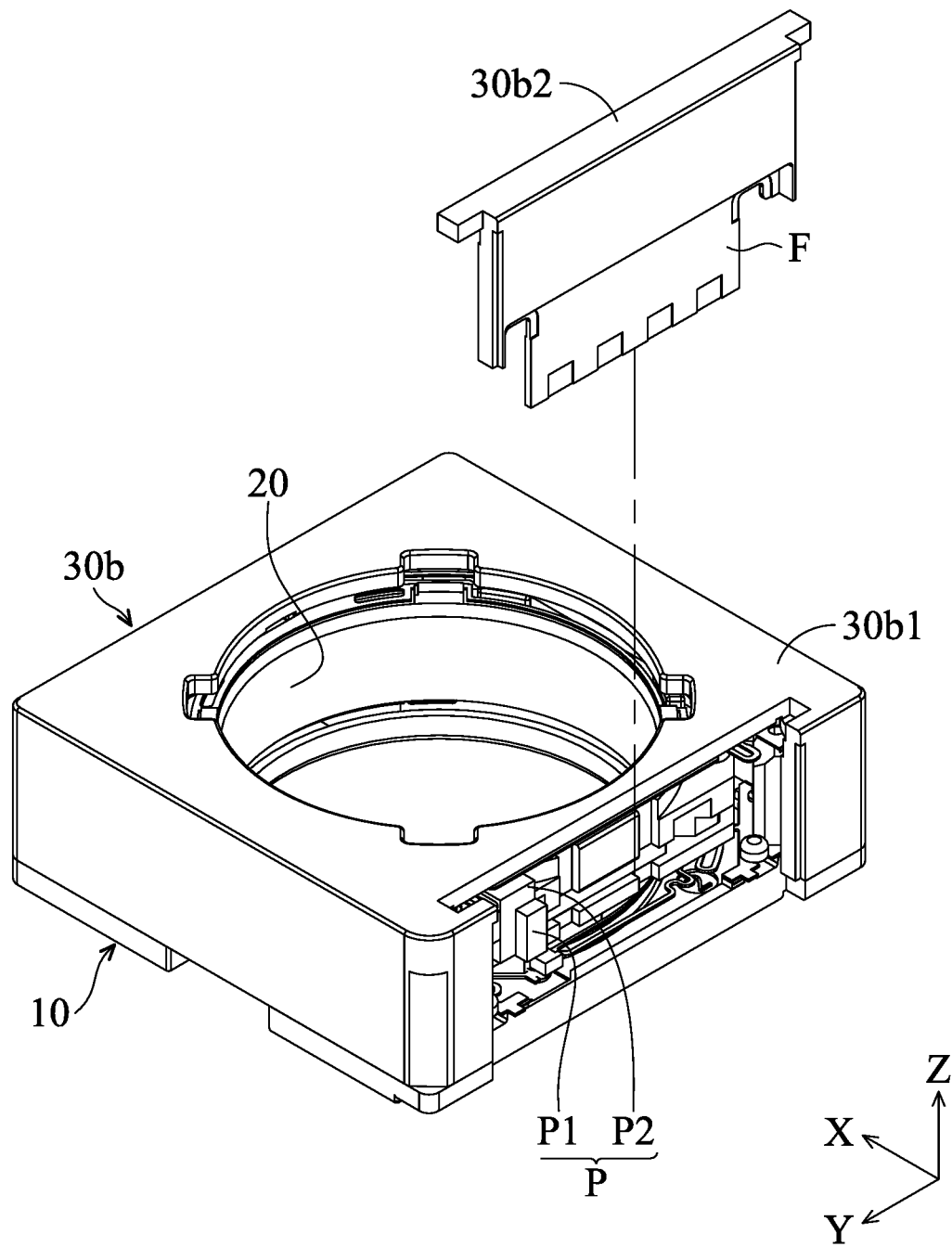
FIG. 9 is a schematic diagram of a lens driving module according to another embodiment of the invention.

In another embodiment, the lens driving module 2' has a casing 30b, as shown in FIG. 9. The main difference between the casing 30b and the casing 30a is that the casing 30b defines a main body 30b1 and a first sub-sidewall 30b2 which is separable from the main body 30b1 (the first sub-sidewall 30b2 is detachably connected to the main body 30b1 and both they have a plastic material), and the sensing assembly Q (such as the circuit board F and the first alignment element P1 thereof) disposed on the first sub-sidewall 30b2 (e.g., by insert molding or 3D MID technology). The sensing assembly Q can be easily assembled/disassembled by assembling/pulling the first sub-sidewall to/out from the first sub-sidewall 30b2.

Embodiment 3

Figure 10:
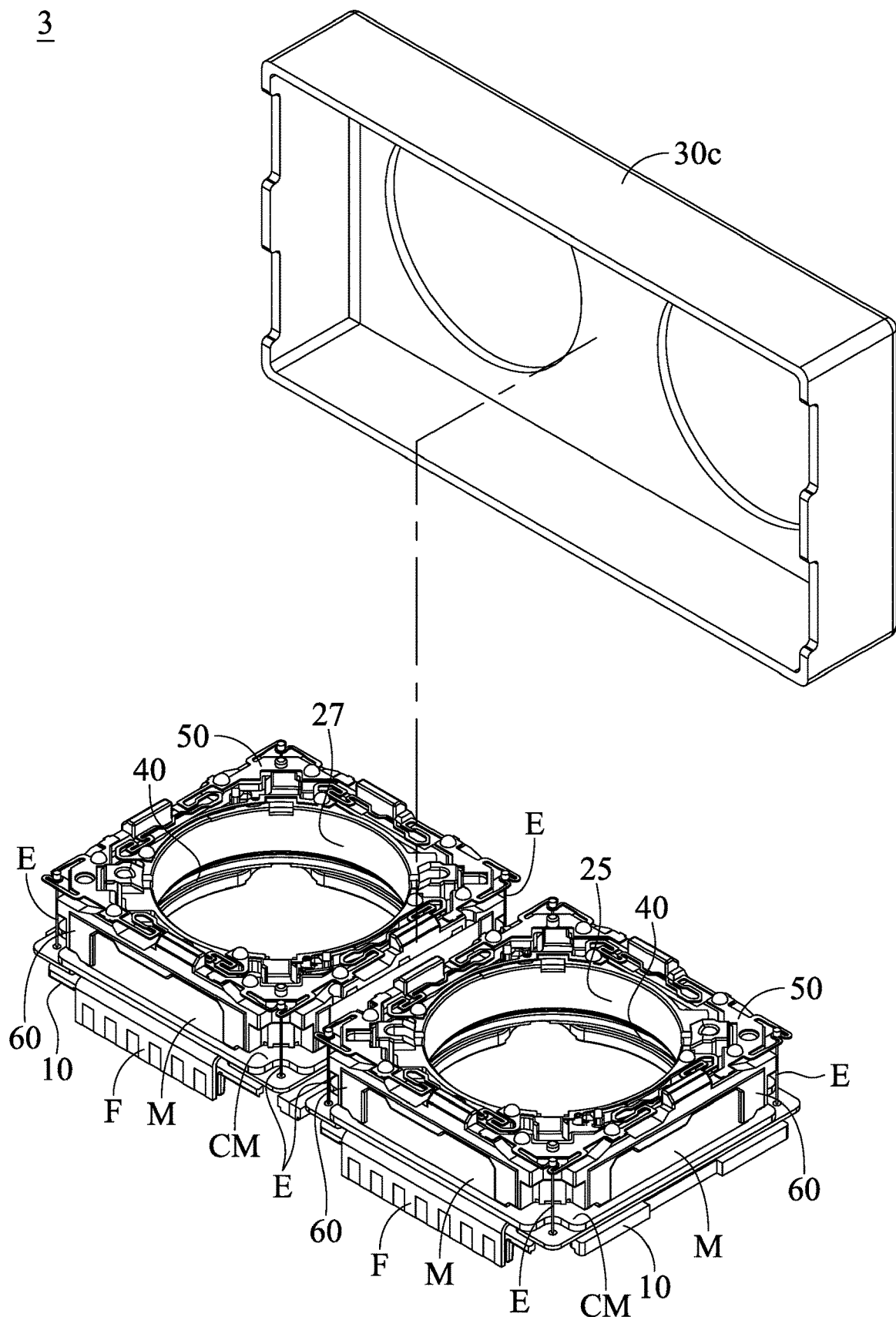
FIG. 10 is a schematic diagram of a lens driving module according to another embodiment of the invention.

FIG. 10 is a schematic diagram of a lens driving module 3 according to another embodiment of the present invention. As shown in FIG. 10, the lens driving module 3 is a module capable of sustaining and driving a plurality of (for example, two) optical lenses, comprising a casing 30c, a first holder 25 and a second holder 27, two frames 60, two first elastic elements 40, two second elastic elements 50, an electromagnet driving assembly (including four magnetic elements M respectively corresponding to the first and second carriers 25 and 27, two surrounding coils (not shown) being disposed around the first and second holders 25 and 27 respectively, and two plate-shaped coils CM corresponding to the first and second holders 25 and 27), a plurality of elastic members E (eight, for example), two bases 10 (capable of carrying image sensors) and two circuit boards F.

In the first holder 25, the first holder 25 can sustain a first optical lens, and one surrounding coil is disposed around the first holder 25 and corresponds to four magnetic elements M disposed on the frame 60. The first holder 25 and the frame 60 are movably connected via the first and second elastic elements 40 and 50, and the corresponding arrangement of the surrounding coil and the magnetic elements M is provided, so that the first holder 25 can move relative to the frame 60. In addition, the four elastic members E connect the second elastic element 50 and the circuit board F, wherein the circuit board F is sandwiched between the coil CM and the base 10, and the coil CM corresponds to the four magnetic members M such that the first holder 25 and the frame 60 can be moved relative to the circuit board F, the coil CM and the base 10 for optical shaking compensation. The second carrier 27, which can sustain a second optical lens, is also provided with the same or similar elements around the periphery of the first holder 25, which will not be described here again. By applying a suitable driving signal (such as a driving current), the magnetic forces generated between the surrounding coils and the magnetic elements M and between the coils CM and the magnetic elements M can independently drive the first and second holders 25 and 27 to move along the direction of the optical axes of the first and second optical lenses, to tilt relative to the optical axes, or linear move (relative to the bases 10) in a direction substantially perpendicular to the optical axes. Therefore, the optical lenses can be moved relative to the image sensors disposed on the bases 10 to achieve auto-focusing or optical image stabilization (OIS).

It should be noted that the casing 30c has a plastic material and is connected to and disposed on the bases 10 for protecting the aforementioned holders 25 and 27, the frames 60, the electromagnetic driving assembly, the elastic elements 40 and 50, the elastic members E and the circuit boards F. Furthermore, since the casing 30c has a plastic material, compared with a lens driving module with an casing that is generally made of a metal material, which can greatly reduce the magnetic interference to the electronic components (such as an antenna, a Bluetooth device, a magnetic force sensing element, etc.) located around the lens driving module 3. In addition, since the casing 30c has (or is made of) a plastic material, wires may be provided on the sidewall thereof by insert molding or 3D MID technology and a sensing assembly (such as the sensing assembly Q of the lens driving module 2 according to the second embodiment) can be arranged (for example, a circuit board F and the first alignment element P1 are disposed on the casing 30c; the second alignment element P2 is disposed on the frame 60), to simplify the internal circuit structure.

Figure 11:
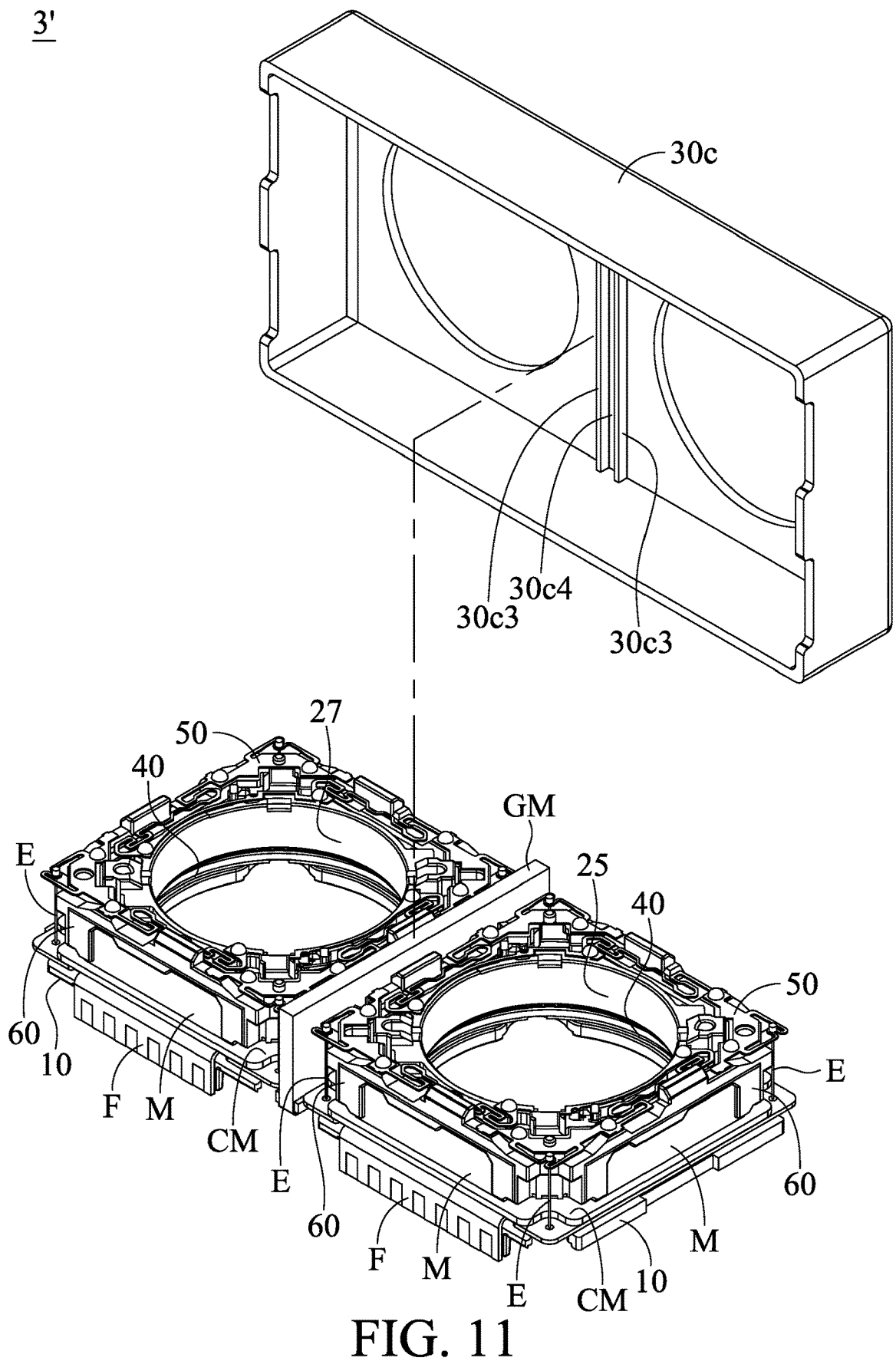
FIG. 11 is a schematic diagram of a lens driving module comprising a permeability element according to another embodiment of the invention.

In another embodiment, as shown in FIG. 11, a lens driving module 3' further comprises a permeability element GM disposed on the casing 30c and between the first and second holders 25 and 27. In more detail, the permeability element GM is located between the two magnetic elements M between the first and second holders 25 and 27. Due to the permeability element GM adjacent to the magnetic elements M, the permeability element GM can not only help the driving module 3' to dissipate heat but also concentrate the magnetic forces of the magnetic elements M in a predetermined direction to enhance the magnetic forces for moving the first and second holders 25 and 27. Moreover, the permeability element GM can block the electromagnetic interference generated by electronic components in the module 3', to enhance the performance and longevity of the components. In addition, a groove 30c4 defined by the protruding ribs 30c3 of the casing 30c can make the permeability element GM more stable and sandwiched (in the optical axis direction) between the casing 30c and the base 10 to reinforce the overall module stability degree.

In one embodiment, an element having a permeability material (e.g., a plate with a permeability material) is embedded on the inner wall of the casing 30c which faces the magnetic elements M. In addition to concentrating the magnetic forces of the magnetic elements M in a predetermined direction to enhance the magnetic forces for moving the first and second holders 25 and 27, the mechanical strength of the casing 30c can be increased. It should be noted that in some embodiments, if the aforementioned magnetic elements M is moved relative to the base 10 (i.e., moving-magnetic-element type), the magnetic elements M are configured to use a non-magnetic metal material to be made, to prevent the magnetic interference problems occur by the casing 30c and the magnetic elements M.

In summary, a lens driving module and a method for assembly thereof are provided. The lens driving module is configured to force an optical lens to move, including a holder, a casing, a base, an electromagnetic driving assembly, a first elastic element, and a second elastic element, wherein the holder is disposed between the first and second elastic elements. The base has a plurality of protrusions. By applying a glue between the outer surfaces of the protrusions (which are parallel to the central axis of the optical lens) and the sidewall of the casing, the casing can be firmly assembled to the base. Furthermore, skewed assembly of the lens driving module caused by tolerances of components may be avoided or reduced due to the side surfaces of the protrusions adhering to the sidewall of the casing. Moreover, before disposing the casing around the base, the second elastic element is connected to the protrusions and the holder, so that there is no need to provide additional space for applying the glue. Therefore, the opening of the casing may be smaller to avoid or reduce the amount of dust or particles entering the lens driving module.

Furthermore, the casing of the lens driving module, according to an embodiment of the present invention, has a plastic material and can be used to sustain the sensing assembly which can be formed on the casing by insert molding or 3D MID technology. Thus, it is possible to reduce the number of parts of the lens driving module by saving to set additional wires, so that the overall volume of the driving module is miniaturization and the assembly cost and process can be reduced. Moreover, compared to the casing with a metal of the electromagnetic drive module, it is possible to reduce the magnetic interference problem.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. An optical element driving module, comprising:
   a casing;
   a base, comprising a main body and at least one protrusion integrally formed with the main body and extending toward the casing, and the protrusion has a side surface, wherein the casing is fixed on the base;
   a holder for holding an optical element having an optical axis;
   a driving assembly for moving the holder relative to the casing and the base; and
   at least one gluing element disposed between and directly contacting the side surface and the casing, wherein the side surface is parallel to the optical axis.

2. The optical element driving module as claimed in claim 1, wherein the casing does not move relative to the base.

3. The optical element driving module as claimed in claim 1, wherein the casing comprises a sidewall extending along the optical axis, and the driving assembly fully overlaps the sidewall when viewed along a direction that is perpendicular to the optical axis.

4. The optical element driving module as claimed in claim 3, wherein the driving assembly comprises a driving magnet having an inner surface facing the holder and an outer surface facing the sidewall, and the area of the inner surface is different from the area of the outer surface when viewed along the direction that is perpendicular to the optical axis.

5. The optical element driving module as claimed in claim 4, wherein the outer surface and the inner surface face opposite directions.

6. The optical element driving module as claimed in claim 3, wherein the gluing elements are disposed between the sidewall and the side surface.

7. The optical element driving module as claimed in claim 1, wherein the casing comprises plastic.

8. The optical element driving module as claimed in claim 1, wherein a distance between the driving assembly and the optical axis is greater than a distance between the casing and the optical axis.

9. The optical element driving module as claimed in claim 1, wherein the driving assembly comprises a coil disposed on the holder and surrounds an axis that is perpendicular to the optical axis.

10. The optical element driving module as claimed in claim 1, wherein the driving assembly is enclosed by the casing and the base in a direction parallel to the optical axis.

11. An optical element driving module, comprising:
    a casing;
    a base comprising at least one protrusion extending toward the casing, and the protrusion has a side surface, wherein the casing is fixed on the base,
    a first holder for holding a first optical element having an first optical axis;
    a second holder for holding a second optical element having a second optical axis;
    a driving assembly configured to force the first and second holders to move relative to the base; and
    a plurality of gluing elements disposed between the side surface and the casing, wherein the side surface is parallel to the first optical axis.

12. The optical element driving module as claimed in claim 11, wherein the casing does not move relative to the base.

13. The optical element driving module as claimed in claim 11, wherein the casing comprises a sidewall extending along the first optical axis, and the driving assembly fully overlaps the sidewall when viewed along a direction that is perpendicular to the first optical axis.

14. The optical element driving module as claimed in claim 13, wherein the driving assembly comprises a driving magnet having an inner surface facing the first holder and an outer surface facing the sidewall, and the area of the inner surface is different from the area of the outer surface when viewed along the direction that is perpendicular to the first optical axis.

15. The optical element driving module as claimed in claim 14, wherein the outer surface and the inner surface face opposite directions.

16. The optical element driving module as claimed in claim 13, wherein the gluing elements are disposed between the sidewall and the side surface.

17. The optical element driving module as claimed in claim 11, wherein the casing comprises plastic.

18. The optical element driving module as claimed in claim 11, further comprising a permeability element disposed between the first holder and the second holder.

19. The optical element driving module as claimed in claim 18, wherein the casing has a groove, and the permeability element is disposed in the groove.

20. The optical element driving module as claimed in claim 18, wherein a length of the permeability element is greater than a width of the first holder in a direction that is perpendicular to the first optical axis.

* * * * *